Figure 1:
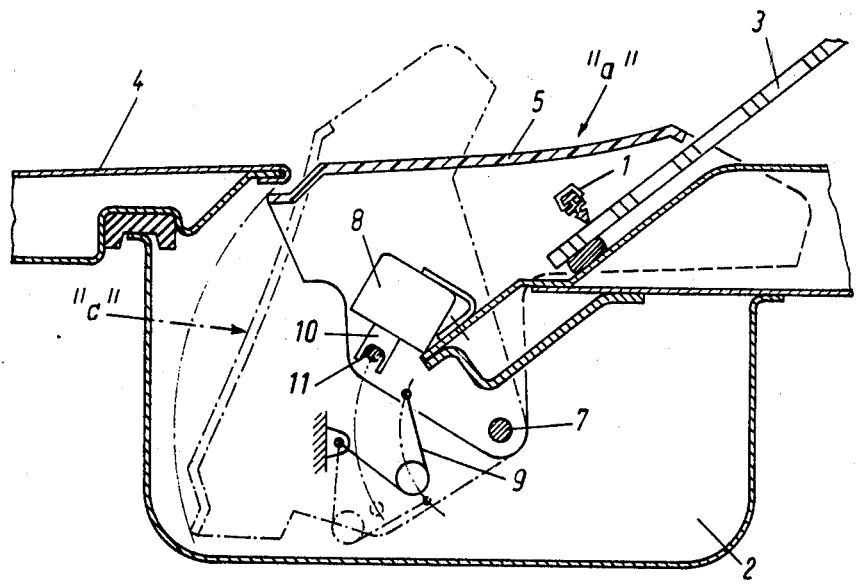

United States Patent [19]

Sacco et al.

[11] 4,283,085
[45] Aug. 11, 1981

[54] PIVOTAL HOOD ARRANGEMENT, ESPECIALLY IN MOTOR VEHICLES

[75] Inventors: Bruno Sacco, Sindelfingen; Hermann Renner, Magstadt, both of Fed. Rep. of Germany

[73] Assignee: Daimler-Benz Aktiengesellschaft, Stuttgart-Untertuerkheim, Fed. Rep. of Germany

[21] Appl. No.: 961,690

[22] Filed: Nov. 17, 1978

[30] Foreign Application Priority Data

Nov. 30, 1977 [DE] Fed. Rep. of Germany ....... 2753371

[51] Int. Cl.³ ............................................... B60J 1/20
[52] U.S. Cl. .................................. 296/84 R; 15/250.16
[58] Field of Search ................ 296/24 R, 84 R, 84 D, 296/84 A, 93; 15/250.16, 250.17, 250.19

[56] References Cited

U.S. PATENT DOCUMENTS

| 3,121,902 | 2/1964 | Massoll | 15/250.19 |
| 3,314,195 | 4/1967 | Ziegler | 296/84 R |
| 3,694,846 | 10/1972 | Parker | 15/250.15 |
| 3,733,915 | 5/1973 | Papadatos et al. | 15/250.19 |

FOREIGN PATENT DOCUMENTS 1217286 12/1970 United Kingdom ................. 15/250.16

Primary Examiner—John J. Love
Assistant Examiner—Boss Weaver
Attorney, Agent, or Firm—Craig and Antonelli

[57] ABSTRACT

A pivotal hood-like structure, especially for use in motor vehicles, for covering a separate aggregate space underneath an engine hood which accommodate a windshield wiper installation arranged between the engine space and the passenger space within the area underneath the windshield. After turning on the windshield wiper installation, the hood-like structure is initially pivoted into and held in a first open position for the operation of the windshield wiper arms, and after turning off the windshield wiper installation, the hood-like structure is returned into the closed position by the force of a spring. The hood-like structure may be manually pivoted into a second wide open position, so as to permit easy access to the aggregate space for purposes of maintenance. A pivot axis of the hood-like structure is arranged so that it is pivoted into the aggregate space during the opening thereof.

11 Claims, 2 Drawing Figures

PIVOTAL HOOD ARRANGEMENT, ESPECIALLY IN MOTOR VEHICLES

The present invention relates to a pivotal hood or lid arrangement, especially to a cowling-like member in motor vehicles, for covering a separate aggregate space underneath an engine hood which accommodates a windshield wiper installation arranged between the engine space and the passenger space within an area underneath the windshield. The hood or lid, after turning on the windshield wiper installation, is pivoted into a first position open for the operation of the windshield wiper arms and is retained in this position, and, after the disengagement of the windshield wiper installation, is returned into a closed position by the force of a spring.

Such an arrangement is already disclosed in the U.S. Pat. No. 2,206,822. However, as a result of the selected arrangement of the pivot axis of the lid or hood, disadvantages exist in this prior art in that the lid or hood is pivoted out or extended relatively far during an opening. An optically disturbing impression results therefrom, as well as an increased danger of injury to pedestrians in case of accidents, and a more difficult accessibility to the aggregate space disposed therebelow.

The present invention is concerned with the task of avoiding the aforementioned disadvantages and to provide a hood or lid arrangement for an aggregate space accommodating a windshield wipper installation, in which the opened lid or hood does not create an aesthetically displeasing or disturbing appearance.

The underlying problems are solved according to the present invention by having the pivot axis of the lid or hood arranged so that the lid or hood is pivoted during an opening into the aggregate space.

A particularly simple pivoted opening of the lid or hood is achieved if a unilaterally acting adjusting motor is provided for the opening purpose.

A particularly good accessibility of the aggregate space is achieved if the lid or hood is pivotal beyond a normal or first open position into a second or wide open position facilitating repair and maintenance operations.

Accordingly, it is an object of the present invention to provide a hood or lid arrangement, especially for use in motor vehicles, which avoids by simple means the aforementioned shortcomings and drawbacks encountered in the prior art.

Another object of the present invention resides in the use of a cowling-like hood or lid arrangement in motor vehicles which can be opened during operation of the windshield wiper system without adversely affecting the appearance of the vehicle.

A further object of the present invention resides in the use of a cowling-like hood or lid arrangement in motor vehicles, adapted to be automatically opened and closed by engagement of the windshield wiper installation of the vehicle, which reduces the injury danger to pedestrians and other traffic participants, and which facilitates the accessibility to the aggregate space disposed therebelow.

Still another object of the present invention resides in the use of a hood-like structure of the type described above which is simple in construction, easy to service and reliable in operation.

Figure 2:
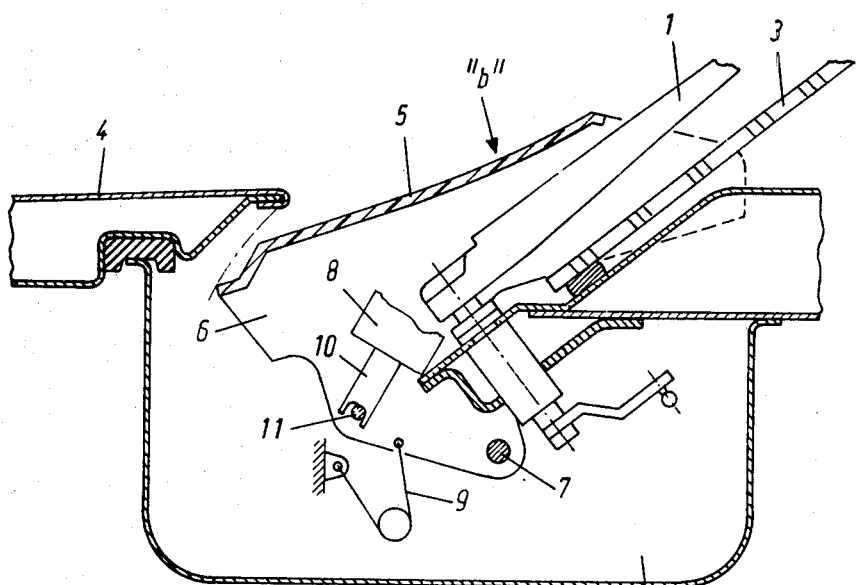

These and other objects, features and advantages of the present invention will become more apparent from the following description which, when taken in connection with the accompanying drawing which shows, for purposes of illustration only, one embodiment in accordance with the present invention, and wherein:

FIG. 1 is a schematic cross-sectional view through a cowling-like hood or lid arrangement, in accordance with the present invention, having a closed lid or hood, whereby the wide open position serving for maintenance and repair is indicated in this figure by dash and dot lines; and FIG. 2 is a cross-sectional view similar to FIG. 1, illustrating the lid or hood arrangement in the normally open position thereof.

Referring now to the drawing wherein like reference numerals are used throughout the two views to designate like parts, an aggregate space 2 accommodating a windshield wiper installation 1, shown only in part, is shown in FIGS. 1 and 2 of the drawing. The aggregate space 2 is located in front of a windshield 3 and underneath the plane of an engine hood 4. The aggregate space 2 is covered by a cowling-like lid or hood 5 which is rotatably supported on a pivot shaft 7 by way of laterally bent-down tabs 6. During the engagement of the windshield wiper installation 1, the lid or hood 5—preceding the wiper movement—is pivoted by a unilaterally acting adjusting motor 8 about the pivot shaft 7 from its normal rest position "a" (FIG. 1) into the open position "b" (FIG. 2). After the disengagement of the windshield wiper installation 1 so that the wiper arms and wiper blades thereof have returned to their normal rest position, the adjusting motor 8 becomes ineffectual and the hood 5 is pulled again into the position "a" (FIG. 1) by a dead center spring 9.

A U-shaped piston rod 10 of the adjusting motor 8 surrounds an entrainment pin 11 arranged on tab 6 of the lid or hood 5. As a result thereof, it becomes possible to pivot the hood 5, during failure of the adjusting motor 8 or for servicing the installations accommodated in the aggregate space 2, into the position "c" (dash and dotted line position in FIG. 1) against the action of the dead center spring 9.

While we have shown and described only one embodiment in accordance with the present invention, it is understood that the same is not limited thereto but is susceptible of numerous changes and modifications as known to those skilled in the art and we, therefore, do not wish to be limited to the details shown and described herein but intend to cover all such changes and modifications as are encompassed by the scope of the appended claims.

We claim:

1. A pivotal hood-like structure for covering a separate aggregate space underneath an engine hood for the accommodation of a windshield wiper installation, said aggregate space being arranged between the engine space and passenger space of a motor vehicle within the area underneath the windshield thereof, said hood-like structure comprising:
   a hood normally covering said separate aggregate space when in a closed position;
   means for mounting said hood so as to be pivotal about a pivot axis into a first open position, whereby said windshield wiper installation may be operated, and into a second open position, whereby increased access to said separate aggregate space may be afforded for purposes of maintenance and repair;
   a reciprocable piston means for displacing said hood between the closed and first open positions;

means fixedly attached to said hood for enabling the reciprocating motion of the reciprocable piston means to be converted into pivotal motion, said enabling means being adapted to be in operable engagement with said piston means when said hood is in its closed and first open positions; and means positioned between said vehicle and said hood, for biasing said hood toward said closed position and for biasing said enabling means into operable engagement with said piston means when said hood is in its closed and first open positions.

2. A hood-like structure according to claim 1, characterized in that said reciprocable piston means includes a unilaterally acting adjusting motor.

3. A hood-like structure according to claim 1 or 2, characterized in that said hood is operable to be manually pivoted from its first open position into said second open position serving for maintenance.

4. A hood-like structure according to claim 3, characterized in that said piston means is disengaged from said enabling means when said hood is pivoted beyond its first open position towards and into said second open position, whereby said motor is prevented from effecting any pivotal movement of said hood during the movement of said hood from its first open position towards and into said second open position.

5. A hood-like structure according to claim 4, characterized in that said hood comprises an upper cover portion lying substantially in the plane of said engine hood and serving as the covering for said aggregate space, and a lower portion comprising laterally bent-down tabs which are substantially orthogonally aligned with said upper cover portion and fixedly attached thereto, said lower portion being positioned with said aggregate space, said pivot axis being positioned at a lowermost part of said lower portion so as to permit said hood to be contained substantially totally within said aggregate space when said hood is in said second open position.

6. A hood-like structure according to claim 5, characterized in that said piston means has a U-shaped end, said enabling means being engageable within said U-shaped end during pivotal movement of said hood between its closed and first open positions, said U-shaped end permitting a disengagement of said enabling means from said piston means when said hood is manually pivoted from said first open position toward said second open position.

7. A hood-like structure according to claim 6, characterized in that said reciprocable piston means is positioned within said aggregate space, whereby access to said piston means is prevented when said hood is in said closed position and is permitted for purposes of maintenance and repair when said hood is manually pivoted to said second open position.

8. A hood-like structure according to claim 7, characterized in that said biasing means comprises a dead center spring.

9. A hood-like structure according to claim 8, characterized in that said hood may be manually pivoted from its closed position into said first open position, as well as into said second open position.

10. A hood-like structure according to claim 9, characterized in that a second separate motor is used to drive said windshield wiper installation.

11. A hood-like structure according to claim 10, characterized in that said enabling means comprises an entrainment pin.

* * * * *